Figure 14:
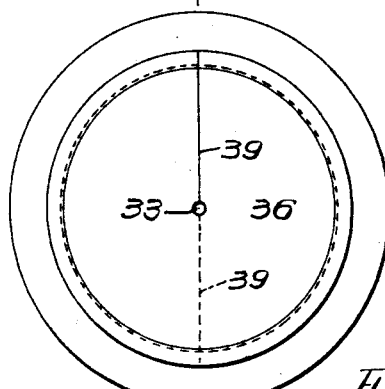

E. R. JOHNSON.
SOUND BOX DIAPHRAGM.
APPLICATION FILED FEB. 16, 1912.
1,180,401.
Patented Apr. 25, 1916.
4 SHEETS—SHEET 1.
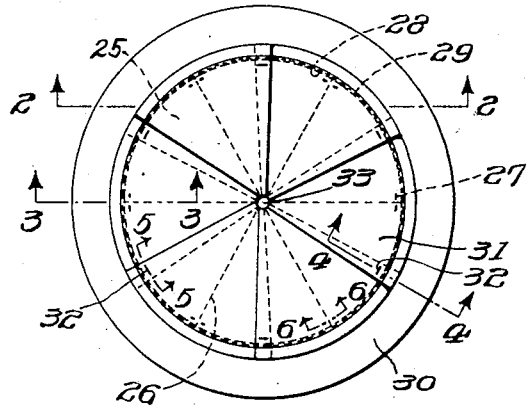
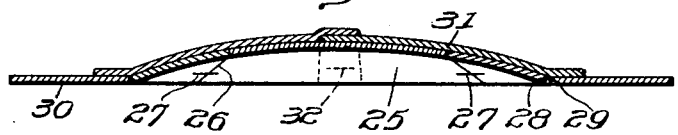
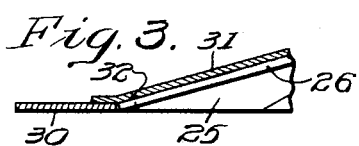
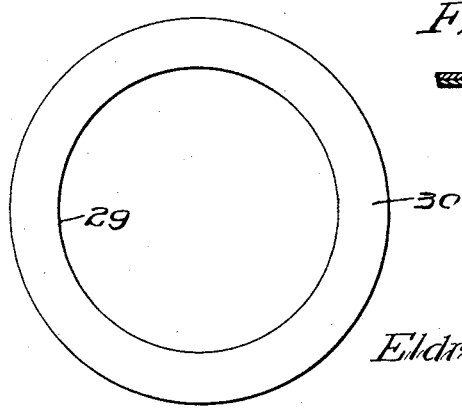
INVENTOR
Eldridge R. Johnson.
WITNESSES
BY
ATTORNEY E. R. JOHNSON.
SOUND BOX DIAPHRAGM.
APPLICATION FILED FEB. 16, 1912.
1,180,401.
Patented Apr. 25, 1916.
4 SHEETS—SHEET 2.
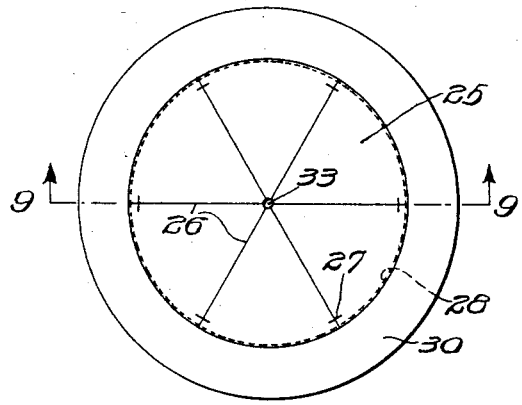
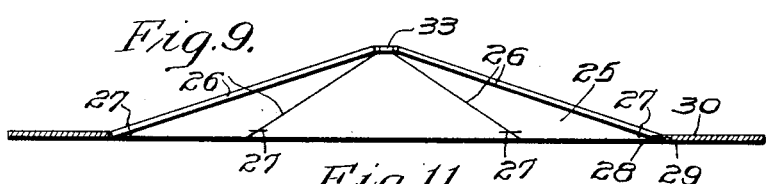
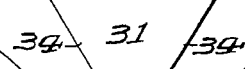
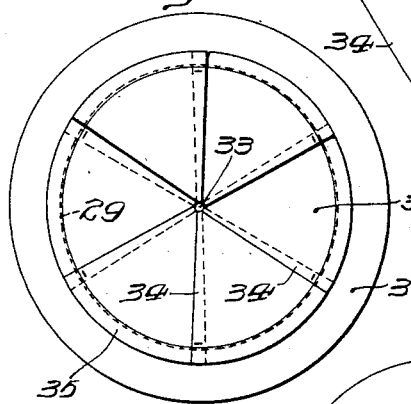
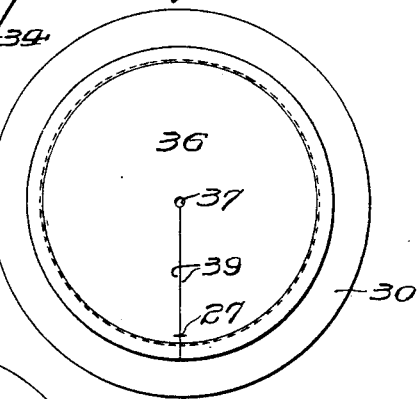
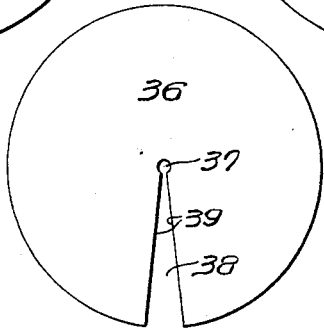
WITNESSES
F. J. Hartman.
Clifton C. Callwell
INVENTOR
Eldridge R. Johnson
BY
ATTORNEY
THE COLUMBIA PLANOGRAPH CO., WASHINGTON, D. C.

E. R. JOHNSON.
SOUND BOX DIAPHRAGM.
APPLICATION FILED FEB. 16, 1912.

1,180,401.

Patented Apr. 25, 1916.
4 SHEETS—SHEET 3.

WITNESSES
F. J. Hartman,
Clifton C. Callwell

INVENTOR
Eldridge R. Johnson

BY

ATTORNEY

THE COLUMBIA PLANOGRAPH CO., WASHINGTON, D. C.

E. R. JOHNSON.
SOUND BOX DIAPHRAGM.
APPLICATION FILED FEB. 16, 1912.
1,180,401.
Patented Apr. 25, 1916.
4 SHEETS—SHEET 4.
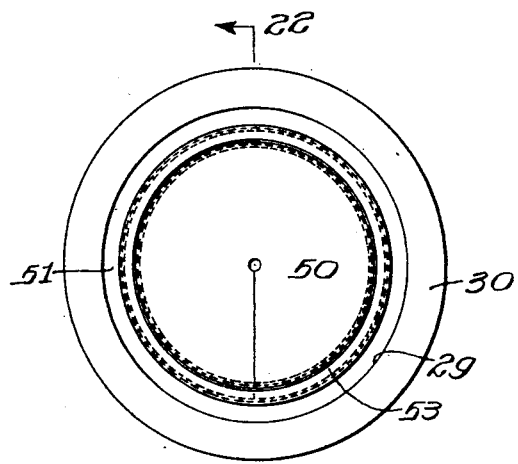
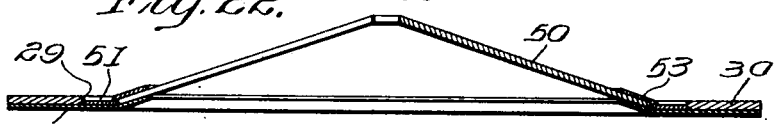
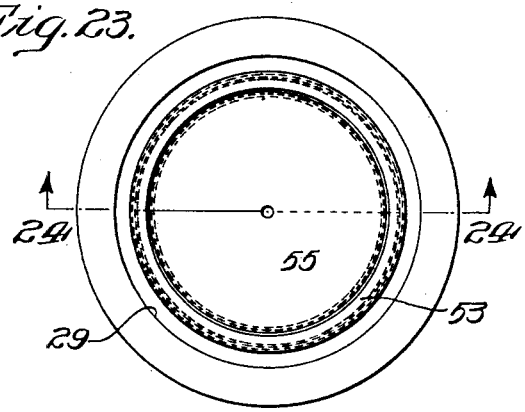
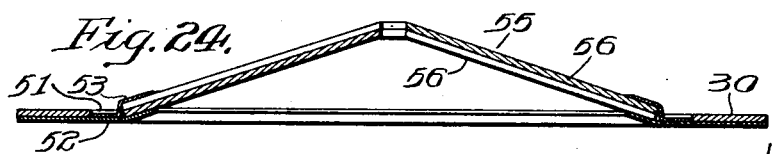
INVENTOR
Eldridge R. Johnson.
WITNESSES
BY
ATTORNEY

UNITED STATES PATENT OFFICE.

ELDRIDGE R. JOHNSON, OF MERION, PENNSYLVANIA, ASSIGNOR TO VICTOR TALKING MACHINE COMPANY, A CORPORATION OF NEW JERSEY.

SOUND-BOX DIAPHRAGM.

1,180,401.  Specification of Letters Patent.  Patented Apr. 25, 1916.

Application filed February 16, 1912. Serial No. 678,120.

*To all whom it may concern:*

Be it known that I, ELDRIDGE R. JOHNSON, a citizen of the United States, and a resident of Merion, county of Montgomery, and State of Pennsylvania, have invented certain new and useful Improvements in Sound-Box Diaphragms, whereof the following is a specification, reference being had to the accompanying drawings.

This invention is particularly directed to vibratory diaphragms for sound recording and reproducing devices, such as may preferably be adapted to the sound reproducing mechanism of a talking machine.

The principal object of this invention is, to provide a diaphragm that will readily respond to the most delicate and rapid vibrations, and accurately record and reproduce all of the high and low tones and the included range with equal clearness and with substantially the same intensity as the original sounds.

Other objects of this invention are, to provide a diaphragm of such construction as to substantially eliminate any stresses and strains that tend to produce false tones or in any way affect the intensity, accuracy and clearness of the reproduction; to provide a diaphragm having its engaged periphery formed of a relatively narrow separate member, and having its major portion separately formed and secured thereto.

Other objects of this invention are, to provide a diaphragm having a bulged major portion formed of a radially slitted disk of sheet material, such as mica, isinglass, celluloid, paper, and similar materials, having its opposed edges secured in overlapped relation; to provide a diaphragm having a bulged major portion formed of a peripherally recessed disk of sheet material having its opposed edges secured in abutted relation; to provide a diaphragm having a bulged major portion formed of a plurality of sectoral sections respectively secured together, with their edges in overlapped relation; to provide a diaphragm having a bulged major portion formed of a plurality of sectoral sections respectively secured together, with their edges abutted; to provide a diaphragm having a bulged laminated portion formed of separate pieces having abutted edges, the abutted edges of the respective laminations being relatively out of registry; to provide a diaphragm having a bulged major portion formed of sections respectively having their edges secured to the edges of adjacent sections by stitching; to provide a diaphragm having a bulged major portion provided with a peripheral integral flange extended at an angle with respect to the central portion and in a plane normal to the axis of said diaphragm; and to provide a diaphragm having a bulged major portion, connected with a separate annular flange spaced therefrom by an annular web of relatively thin material.

Generally stated, the form of this invention hereinafter described provides a flat, annular, vibratory flange, to which is secured a bulged or conical substantially inflexible major portion adapted to reciprocate as a whole within the engaged peripheral edge of said annular flange.

Figure 16:
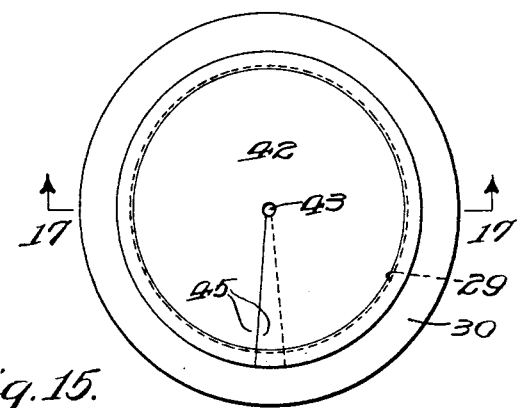
Figure 15:
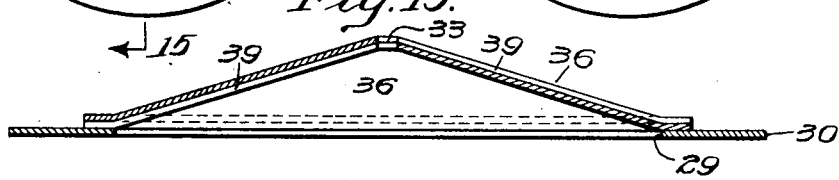
Figure 17:
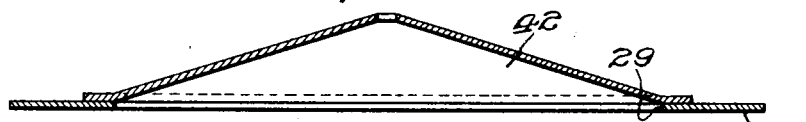
Figure 18:
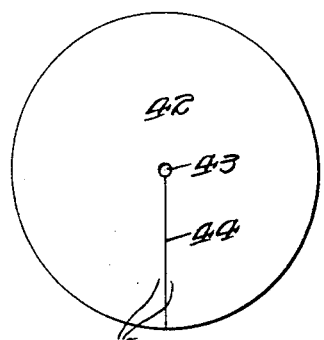
Figure 19:
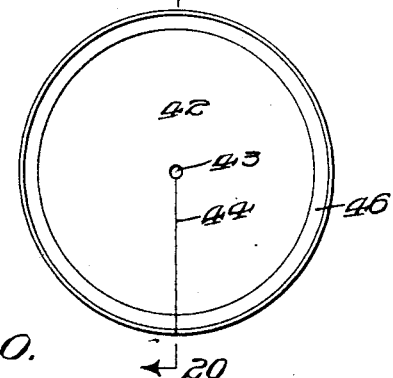
Figure 20:
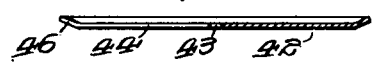

In the accompanying drawings, Figure 1 is a face view of a diaphragm showing a convenient embodiment of this invention; Fig. 2 is a sectional view of said diaphragm taken on the line 2—2 in Fig. 1; Fig. 3 is a fragmentary sectional view of said diaphragm taken on the line 3—3 in Fig. 1; Fig. 4 is a fragmentary sectional view of said diaphragm taken on the line 4—4 in Fig. 1; Fig. 5 is a fragmentary sectional view of said diaphragm taken on the line 5—5 in Fig. 1; Fig. 6 is a sectional view of said diaphragm taken on the line 6—6 in Fig. 1; Fig. 7 is a face view of the annular peripheral supporting flange, *per se;* Fig. 8 is a face view of a modification of the diaphragm shown in Fig. 1; Fig. 9 is a central transverse sectional view of the diaphragm shown in Fig. 8, taken on the line 9—9 in said figure; Fig. 10 is a face view of another modification of the diaphragm shown in Fig. 1; Fig. 11 is a face view of one of the segments forming the conical central portion of the diaphragm shown in Fig. 10; Fig. 12 is another modification of the diaphragm shown in Fig. 1; Fig. 13 is a face view of the flat blank from which the central portion of the diaphragm shown in Fig. 12 is formed; Fig. 14 is a face view of another modification of the diaphragm shown in Fig. 1; Fig. 15 is a central transverse sectional view of the diaphragm shown in Fig. 14, taken on the line 15—15 in said figure; Fig. 16 is a face view of another modification of the diaphragm shown in Fig. 1; Fig. 17 is a central transverse sectional view of the diaphragm shown in Fig. 16, taken on the line 17—17 in said figure; Fig. 18 is a face view of the flat blank from which the central portion of the diaphragm shown in Figs. 16 and 17 is formed; Fig. 19 is a face view of the blank shown in Fig. 18, having its peripheral margin slightly turned up to form a flange for engagement with the annular ring shown in Fig. 7; Fig. 20 is a central transverse sectional view of the blank shown in Fig. 19, taken on the line 20—20 in said figure; Fig. 21 is a face view of another modified form of diaphragm; Fig. 22 is a central transverse sectional view of the diaphragm shown in Fig. 21, taken on the line 22—22 in said figure; Fig. 23 is a face view of another form of the diaphragm shown in Fig. 21; and Fig. 24 is a central transverse sectional view of the diaphragm shown in Fig. 23, taken on the line 24—24 in said figure.

In the omnibus form of this invention shown in Fig. 1 of the drawings, the central major portion of the diaphragm comprises a laminated structure formed of a plurality of sectoral members 25, respectively having their radial or lateral edges 26 abutted and joined by stitches 27, and having their circumferential or outer edges 28 abutted with the inner edge 29 of the peripheral annular supporting flange member 30. Superimposed upon the conical structure formed by the sectoral members 25, are a plurality of relatively broad sectoral members 31 respectively having their radial or lateral margins overlapping the margins of their adjacent members and conveniently secured together by any suitable means, preferably by an adhesive or by stitches 32, or both, and having their circumferential margins overlapping the annular flange 30.

As best shown in Fig. 1, the abutted edges of the sectoral members 25 are preferably disposed intermediate of the overlapped margins of the sectoral members 31. The diaphragm thus formed is preferably provided with a central aperture 33, for the convenient attachment with a stylus bar (not shown).

The form of this invention shown in Figs. 8 and 9 is a simplification of the diaphragm shown in Figs. 1 to 7, inclusive, and comprises a major central conical portion formed of sectoral members 25, preferably secured together by stitches 27, and having their circumferential or outer edges 28 in abutted relation to the inner edge 29 of the annular flange member 30, as the subjacent lamina formed by the members 25, shown in Fig. 1. The abutted radial or lateral edges 26 of the members 25, and the abutted circumferential or outer edges 28 of said sectoral members 25, and the edges 29 of the annular flange member 30 may preferably be secured by a suitable adhesive to form a substantially integral structure.

It is to be understood that while the stitches 27 are shown as disposed only near the periphery of the conical structure formed by the sectoral members 25, said sectoral members may be secured together by stitches disposed at different regions along the abutted edges, and, furthermore, the conical structure formed by said sectoral members 25 may be secured to the annular flange member 30 by stitches in the same manner.

The form of this invention shown in Figs. 10 and 11 is another simplification of the structure shown in Figs. 1 to 7, inclusive, and comprises the annular flange member 30, and the central conical major portion comprising the sectoral members 31 respectively having their radial or lateral margins 34 in overlapped relation with the adjacent sections, and their circumferential margins 35 flanged in a plane normal to the axis of the conical structure thus formed, and preferably secured by an adhesive in overlapped relation with the inner margin adjacent to the edge 29 of the annular flange member 30.

The form of this invention shown in Figs. 12 and 13 is a still further simplification of the structure shown in Figs. 1 to 7, inclusive, and comprises the annular flange member 30, and the central conical major portion formed of a single piece 36 of sheet material having a central circular opening 37 and a V-shaped recess 38, forming opposed edges 39 which are substantially radial to the center of the piece 36. The radial edges 39 formed by the recess 38 in the piece 36 are brought together and secured, preferably by an adhesive or by the stitches 27, or both, as shown in Fig. 12, thus forming a conical major portion having a periphery of greater diameter than the inner diameter of the annular flange member 30, and having its peripheral margin in overlapped relation with the inner margin of the annular flange member 30, and secured thereto in any suitable manner, preferably by an adhesive.

The form of this invention shown in Figs. 14 and 15 is a structure similar to the form of the invention shown in Figs. 12 and 13, but having the central conical major portion laminated and comprising superimposed conically formed pieces 36 of sheet material, secured together with their respective abutted edges 39 disposed out of registry; that is to say, the abutted edges 39 of the subjacent conically formed piece 36 being disposed beneath an uncut portion of the web of the superjacent conically formed piece 36, and the abutted edges 39 of said superjacent member being disposed over an uncut portion of the web of said subjacent member, the abutted edges 39 of the respective lamina being preferably disposed in alinement, as best shown in Fig. 14, the conical central major portion overlapping, and being secured to the inner margin of the annular flange member 30, adjacent to the edge 29.

The form of this invention shown in Figs. 16 to 20, inclusive, comprises a still further simplified structure, comprising the annular flange member 30, and the central conical major portion formed of a single piece 42 of sheet material, which, as best shown in Fig. 18, is a circular disk having a central aperture 43, and provided with a radial slit 44, forming opposed edges, the margins 45 along which may be overlapped, as shown in Fig. 16, to form the central conical substantially inflexible major portion of the diaphragm.

As shown in Figs. 19 and 20, the peripheral margin of the piece 42 may be slightly upturned to form a marginal flange 46 (see Fig. 20) before having the edges of the slit 44 overlapped. Thus it will be seen that when the margins 45 along the edges of the slit 44 are overlapped and secured together to form the conical piece 42, the flange 46 will occupy a position in a plane substantially normal to the axis of the conical central major portion formed by the piece 42, which flange 46 may be readily secured in any suitable manner, in overlapped relation with the inner margin of the annular flange member 30, as shown in Figs. 16 and 17.

The form of this invention shown in Figs. 21 and 22 is similar to the form shown in Figs. 12 and 13, in so far as the central conical major portion is concerned. In this form of the invention, however, the diameter of the conical central portion 50 is less than the inner diameter of the annular flange member 30, so, as best shown in Fig. 22, an annular gap 51 is formed between the outer periphery of the central portion 50 and the inner edge 29 of the annular flange member 30.

As best shown in Fig. 22, the central conical portion 50 may be secured to the annular flange member 30 by a relatively thin annular membrane 52, which is suitably secured to one face of the annular flange member 30, and to the inner peripheral margin of said conical portion 50, and an annular membrane 53 secured to the membrane 52 between the inner edge 29 of the annular flange member 30 and the outer edge of the portion 50, and overlapping the peripheral margin of said portion 50 and secured to its outer face. By this construction it will be seen that the central portion 50 being substantially inflexible, has a great freedom of reciprocation with respect to the flange member 30, with which it is connected by the relatively thin and highly flexible membrane.

The form of this invention shown in Figs. 23 and 24 is similar to the form shown in Figs. 14 and 15, in so far as the central conical portion of the diaphragm is concerned, and comprises the conical central major portion 55 formed of lamina members 56, substantially formed as shown in Fig. 13 and placed together substantially as shown in Figs. 14 and 15, inclusive. In this form of the invention, like the form shown in Figs. 21 and 22, the outer periphery of the central conical major portion of the diaphragm is less than the diameter of the inner edge of the annular flange member 30, and is joined by the membranes 52 and 53 respectively, as in said Figs. 21 and 22.

It is believed that by forming a diaphragm with an annular flange which is separate from and secured to a separately formed conical central major portion in the manner above set forth, undesirable strains and stresses which would be incident to the forming of a diaphragm of a single piece of sheet material having its central portion bulged, will be substantially eliminated, and the annular flange thus formed will be therefore more susceptible in responding to the vibrations occasioned by sound waves, than if the diaphragm were formed of a single piece.

Although the diaphragm as above described is referred to generally as being formed of sheet material, it is to be understood that it is preferable to form said diaphragm of mica or like material, which, as will be noted, may be readily cut and formed into the desired shapes, and which may have its parts secured by stitching, to prevent the accidental separation of said parts.

It is not desired to limit this invention to the precise details of construction and arrangement herein set forth, as it is obvious that various modifications may be made therein without departing from the essential features of the invention as defined in the appended claims.

Having thus described my invention, I claim:

1. In a diaphragm, the combination with a separately formed annular flange member of sheet material, having inner and outer edges, of a conical central major portion having a central aperture and comprising a sectoral section of sheet material having radial edges secured together and a peripheral edge secured to the inner edge of said flange member.

2. In a diaphragm, the combination with a separately formed annular peripheral flange member of sheet material, of a conical central major portion having a central aperture and comprising a sectoral section of sheet material, having radial edges secured together and a margin secured in overlapped relation with the inner margin of said annular flange member.

3. In a diaphragm, the combination with a separately formed annular member of sheet material, having inner and outer edges, of a substantially conical central major portion having a central aperture and comprising a sectoral section of sheet material, having its radial edges secured together, and its peripheral edge secured to the inner edge of said annular member.

4. In a diaphragm, the combination with a separately formed annular member, of a conical central major portion comprising a sectoral section, having its radial edges secured together and its peripheral edge extended over the inner margin of said annular member and secured thereto.

5. In a diaphragm, the combination with a separately formed annular member, of a conical central major portion comprising a sectoral section of sheet material, having is radial edges secured together, and its peripheral margin extended to form a flange, in a plane normal to the axis of the conical structure thus formed, and means for securing said flanged portion with said annular member.

6. In a diaphragm, the combination with a separately formed annular member, of a conical central major portion comprising a sectoral section of sheet material, having the margins along its radial edges secured in overlapped relation, and its peripheral edge secured to said annular member.

7. In a diaphragm, the combination with a separately formed annular member of sheet material, of a conical central major portion comprising a sectoral section of sheet material, comprising a substantially circular disk having a radial slit, the margins along said slit being secured in overlapped relation, and having its peripheral margin secured to said annular member.

8. In a diaphragm, the combination with a separately formed annular member, of a bulged central major portion having a central aperture and comprising a sectoral section of sheet material formed of a disk having a radial slit, the margins along said slit being secured in overlapped relation, and the peripheral margin being flanged in a plane normal to the axis of the bulged structure thus formed, said flange being secured in overlapped relation with said annular member.

9. In a diaphragm, the combination with a separately formed member of sheet material, having inner and outer edges, of a conical central major portion comprising a sectoral piece of sheet material, having its lateral margins secured in overlapped relation, and having its outer margin extended over a portion of said annular member and secured thereto.

10. A diaphragm formed of an annular peripheral member of sheet material, and a separately formed central major portion comprising a disk of sheet material slitted radially and having its peripheral edge upturned to form a flange for engagement with said peripheral member.

11. A diaphragm formed of an annular peripheral member of mica, and a separately formed central major portion comprising a disk of mica slitted radially and having its peripheral edge upturned to form a flange for engagement with said peripheral member.

12. A diaphragm formed of a peripheral member of mica, and a separately formed central major portion comprising a disk of mica slitted radially and having its marginal radial edges overlapped and secured together by stitches.

13. A diaphragm comprising an annular member forming the outer portion of the diaphragm, and a cup-shaped member having an outer marginal edge secured to said annular member, and having edges secured together and extending inwardly from said marginal member, said cup-shaped member forming the central portion of said diaphragm.

14. A diaphragm comprising a substantially flat annular member forming the outer part of the diaphragm, and a cup-shaped member secured marginally to the inner margin of said annular member and provided with radial edges secured together.

15. A diaphragm comprising a substantially flat annular member forming the outer part of the diaphragm, and a cup-shaped member secured marginally to the inner margin of said annular member and provided with radial overlapped edges secured together.

16. In a diaphragm, the combination with a separately formed annular member of sheet material, having inner and outer edges, of a cup-shaped central major portion, comprising sheet material having edges secured together and extending from the inner edge of said annular member inwardly, and having a peripheral edge secured to the inner edge of said annular member.

17. A diaphragm comprising a cup-shaped member having edges extending from the periphery of the disk inwardly and secured together, and an annular member of sheet material, secured to the marginal portion of said disk.

18. A diaphragm comprising an annular member forming the outer portion of the diaphragm and a disk of sheet material slit from the periphery thereof toward the center and having the edges adjacent said slit secured together to form a cupped member and the edge of the cupped member so formed being secured to the inner edge of said annular member.

In witness whereof, I have hereto set my hand this 9th day of February, A. D. 1912.

ELDRIDGE R. JOHNSON.

Witnesses:
CHARLES F. WILLARD,
FRANK B. MIDDLETON, Jr.

Copies of this patent may be obtained for five cents each, by addressing the "Commissioner of Patents, Washington, D. C."